US011691755B2

(12) United States Patent
Gu et al.

(10) Patent No.: US 11,691,755 B2
(45) Date of Patent: Jul. 4, 2023

(54) MULTI-UAV MANAGEMENT

(71) Applicant: Wing Aviation LLC, Mountain View, CA (US)

(72) Inventors: Kaiwen Gu, Sunnyvale, CA (US); Matthew Nubbe, Santa Clara, CA (US)

(73) Assignee: Wing Aviation LLC, Mountain View, CA (US)

( * ) Notice: Subject to any disclaimer, the term of this patent is extended or adjusted under 35 U.S.C. 154(b) by 335 days.

(21) Appl. No.: 15/953,831

(22) Filed: Apr. 16, 2018

(65) Prior Publication Data

US 2019/0315482 A1 Oct. 17, 2019

(51) Int. Cl.
*B64D 45/00* (2006.01)
*B64C 39/02* (2023.01)
*G05D 1/10* (2006.01)
*B64U 101/60* (2023.01)

(52) U.S. Cl.
CPC ............ *B64D 45/00* (2013.01); *B64C 39/024* (2013.01); *G05D 1/104* (2013.01); *B64D 2045/0085* (2013.01); *B64U 2101/60* (2023.01)

(58) Field of Classification Search
CPC ............ B64D 45/00; B64D 2045/0085; B64C 39/024; B64C 2201/128; G05D 1/104; G05B 23/0286; G05B 23/0235; G05B 23/0283; G06F 30/15; G06N 3/08
See application file for complete search history.

(56) References Cited

U.S. PATENT DOCUMENTS

| | | | |
|---|---|---|---|
| 9,244,147 B1 | 1/2016 | Soundararajan et al. | |
| 9,307,383 B1 | 4/2016 | Patrick | |
| 9,852,644 B2 | 12/2017 | Salnikov et al. | |
| 10,124,893 B1* | 11/2018 | Aalund | B64C 39/024 |
| 2007/0093946 A1 | 4/2007 | Gideoni | |
| 2012/0259505 A1* | 10/2012 | Turban | G06F 11/0739 |
| | | | 701/31.8 |
| 2013/0026299 A1* | 1/2013 | Constans | G05D 1/0676 |
| | | | 244/202 |

(Continued)

FOREIGN PATENT DOCUMENTS

WO 2017198696 A2 11/2017

OTHER PUBLICATIONS

International Search Report and Written Opinion for International Application No. PCT/US2019/027288 dated Jun. 21, 2019. 14 pages.

(Continued)

*Primary Examiner* — Christian Chace
*Assistant Examiner* — Jordan S Fei
(74) *Attorney, Agent, or Firm* — McDonnell Boehnen Hulbert & Berghoff LLP

(57) ABSTRACT

Aspects of the disclosure relate to identifying and responding to problem conditions for a fleet of aerial vehicles. This may include receiving at one or more processors of one or more server computing devices sensor feedback from an AV of the fleet. A problem condition may be identified using the sensor feedback. A mitigation response for the problem condition relating to a mission assigned to the aerial vehicle may be determined. The mitigation response may be sent to the AV in order to cause the aerial vehicle to maneuver according to the mitigation response and thereby automatically respond to the problem condition.

20 Claims, 11 Drawing Sheets

(56) References Cited

U.S. PATENT DOCUMENTS

| | | | |
|---|---|---|---|
| 2015/0225081 A1* | 8/2015 | Stabler | B64C 39/024 |
| | | | 701/3 |
| 2016/0124434 A1* | 5/2016 | Gariepy | G05D 1/0297 |
| | | | 701/23 |
| 2016/0217698 A1* | 7/2016 | Liu | G05D 1/101 |
| 2016/0307447 A1* | 10/2016 | Johnson | B60L 58/12 |
| 2017/0106986 A1 | 4/2017 | Sweeny et al. | |
| 2019/0005828 A1* | 1/2019 | Costas | G05D 1/101 |
| 2019/0061531 A1* | 2/2019 | Harrington | H02P 3/22 |

OTHER PUBLICATIONS

The International Bureau of WIPO, International Preliminary Report on Patentability dated Oct. 20, 2020, issued in connection with International Patent Application No. PCT/US2019/027288 filed on Apr. 12, 2019, 8 pages.

* cited by examiner

| UAV Identifier | Current Location | Assigned to Mission? | Mission Status | Time of Last Update | Flagged for Inspection |
|---|---|---|---|---|---|
| 400 | X1,Y1,Z1 | Yes | 0/2 Tasks Completed | 00:00:10 | No |
| 500 | X2,Y2,Z1 | No | N/A | 00:00:01 | Yes |
| 510 | X3,Y3,Z3 | No | N/A | 00:00:02 | |
| 520 | X4,Y4,Z4 | No | | | |
| 530 | X5,Y5,Z5 | Yes | | | |

| Condition ID | Severity | Mitigation Response |
|---|---|---|
| 001 | Minor | Flag for inspection |
| 002 | Moderate | Flag for inspection and determine whether and how to continue any assigned Mission. |
| 003 | Critical | Flag for inspection and UAV immediately. |
| 004 | Minor | Flag for inspection |
| 005 | Moderate | |

MULTI-UAV MANAGEMENT

BACKGROUND

Delivery services, also known as courier services, mail services, and shipping services, such as those offered by the U.S. Postal Service and commercial carriers, provide delivery of letters, packages, and parcels to and from residences and businesses across the country. As the number of deliveries increases, alternative methods of such delivery services are becoming more and more popular. For instance, unmanned aerial vehicle (UAV) may be used to perform various tasks relating to delivery services, including, for instance, picking up and dropping off packages for "last mile" deliveries. These UAVs can be controlled by a remote human operator and/or autonomously to complete such tasks. UAVs can therefore be efficient tools for providing such services but can also be subject to problems, such as battery failures and other conditions, which are difficult for human operators to identify while the UAV is in flight.

BRIEF SUMMARY

Aspects of the present disclosure provide a system for identifying and responding to problem conditions for a plurality of aerial vehicles. The system includes one or more processors configured to receive, from an aerial vehicle of the plurality of aerial vehicles, sensor feedback; identify a problem condition using the sensor feedback; determine a mitigation response for the problem condition, the mitigation response relating to a mission assigned to the aerial vehicle; and send the mitigation response to the aerial vehicle in order to cause the aerial vehicle to maneuver according to the mitigation response and thereby automatically respond to the problem condition.

In one example, the one or more processors are part of one or more server computing devices remote from the aerial vehicle. In this example, the system also includes the aerial vehicle, and wherein the aerial vehicle is an unmanned aerial vehicle. In addition, the system also includes the plurality of aerial vehicles, and wherein the server computing devices are configured to identify one or more problem conditions of one or more other aerial vehicles of the plurality of aerial vehicles. In another example, the one or more processors are further configured to use the problem condition to estimate a remaining flight time for the aerial vehicle, and wherein the estimated remaining flight time is used to determine the mitigation response. In another example, the one or more processors are further configured to use the problem condition to estimate a remaining flight distance for the aerial vehicle, and wherein the estimated remaining flight distance is used to determine the mitigation response. In another example, the problem condition corresponds to a current problem with the aerial vehicle. In another example, the problem condition corresponds to an expected future problem with the aerial vehicle. In another example, identifying the problem condition includes determining whether the sensor feedback meets a threshold value for the problem condition. In another example, identifying the problem condition includes determining whether the sensor feedback meets a combination of two or more threshold value for the problem condition. In another example, identifying the problem condition includes inputting the sensor feedback into a model that outputs the problem condition. In another example, the one or more processors are further configured to, after identifying the problem condition, flagging the aerial vehicle for inspection. In another example, the one or more processors are further configured to determine the mitigation response further based on a severity of the problem condition. In another example, the problem condition corresponds to a broken propeller. In another example, the problem condition corresponds to a battery failure. In another example, the problem condition corresponds to a motor failure.

Another aspect of the disclosure provides a method of identifying and responding to problem conditions for a plurality of aerial vehicles. The method includes receiving, by one or more processors of one or more server computing devices, from an aerial vehicle of the plurality of aerial vehicles, sensor feedback; identifying, by the one or more processors, a problem condition using the sensor feedback; determining, by the one or more processors, a mitigation response for the problem condition, the mitigation response relating to a mission assigned to the aerial vehicle; and sending, by the one or more processors, the mitigation response to the aerial vehicle in order to cause the aerial vehicle to maneuver according to the mitigation response and thereby automatically respond to the problem condition.

In one example, the method also includes using, by the one or more processors, the problem condition to estimate a remaining flight time for the aerial vehicle, and wherein the estimated remaining flight time is used to determine the mitigation response. In another example, identifying the problem condition includes determining whether the sensor feedback meets a threshold value for the identified problem condition. In another example, identifying the problem condition includes determining whether the sensor feedback meets a combination of two or more threshold value for the identified problem condition.

BRIEF DESCRIPTION OF THE DRAWINGS

FIG. 5 is an example of status information for UAVs of a fleet of UAVs in accordance with aspects of the disclosure.

FIG. 6 is an example table in accordance with aspects of the disclosure.

DETAILED DESCRIPTION

Figure 1A:
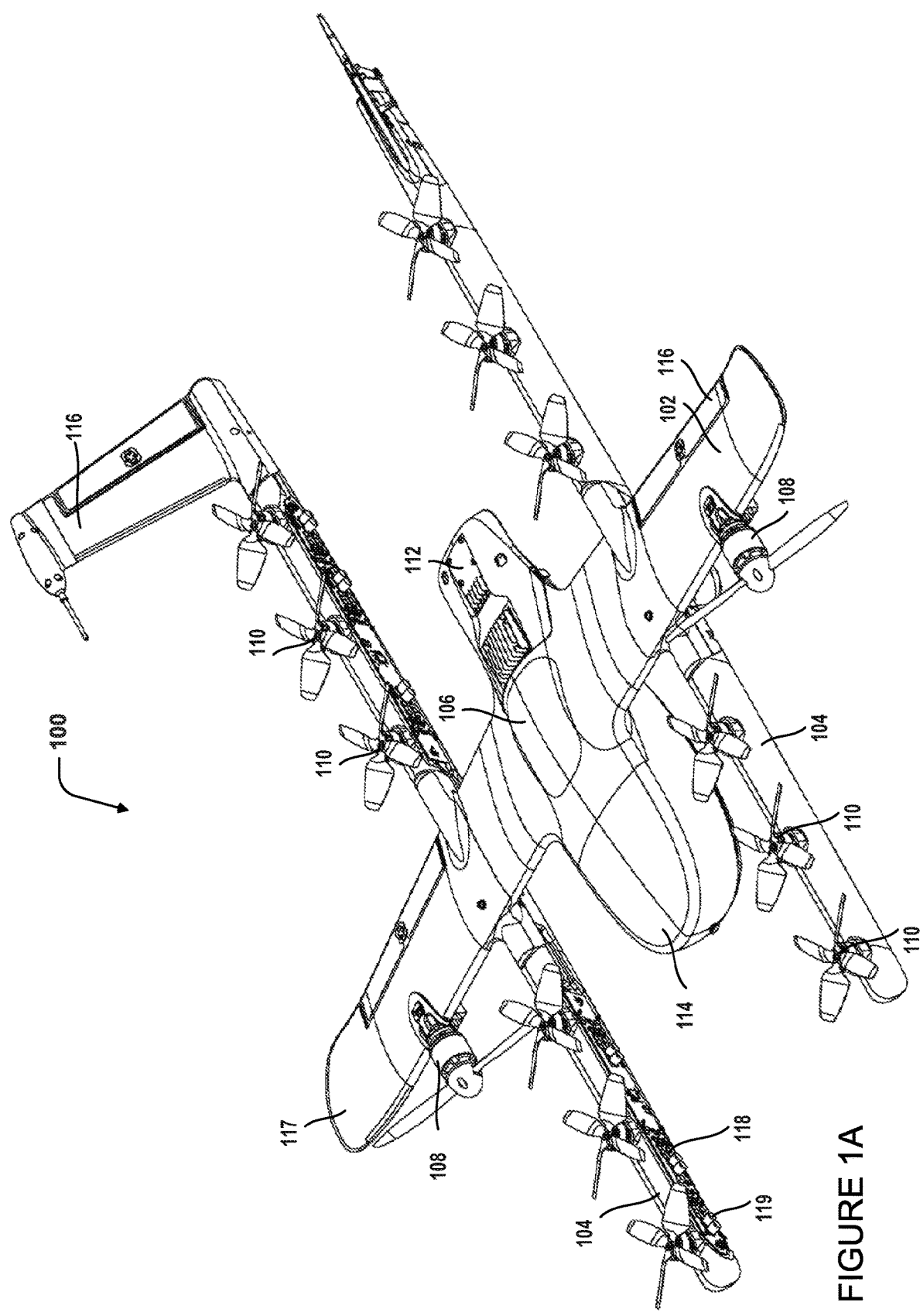
FIGS. 1A-1E are examples of UAVs in accordance with aspects of the present disclosure.

The technology relates to assessing status and responding to predicted problems or failures in UAVs or, more generally, aerial vehicles. For instance, each UAV in a fleet or group of multiple UAVs may continuously report sensor data regarding the status of that UAV's various systems to a remote system controller. The controller may analyze the data, for instance using various models, and make a determination regarding the condition of that UAV. This determination may be used to address possible problems or failures with the UAVs before those failures actually occur increasing the efficiency and safety of the UAVs.

An example management system for managing a group of multiple UAVs may include server computing devices, one or more client computing devices, a plurality of aerial UAVs, and a storage system connected via a network. The server computing devices may be configured to generate and assign missions to the UAVs. Each mission may include a flight plan, which may include a path identifying where the UAV should fly as well as corresponding maneuvers, such as changing directions, hovering, etc. Each mission may also include one or more tasks, such as picking up or delivering packages. In addition, the UAVs of the group may periodically send the server computing devices information relating to the status of the UAVs, which is discussed further below. The one or more server computing devices may use the received information to update or change the information maintained at the storage system.

The storage system may store various types of information that may be retrieved or otherwise accessed by the server computing devices, such as status information for each UAV of the group, aerial maps, and outstanding tasks that can be used to generate mission information including flight plans and corresponding tasks. In addition, the storage system may store baseline information, thresholds, models, mitigation responses, and other data.

As an example, a UAV may include a computing device, a flight control system, a power system, a plurality of sensors, and a communication system. The UAV may take any number of different physical configurations which may dictate the features of the flight control system and power system. The plurality of sensors may be located throughout the UAV in order to provide data or sensor feedback from different locations and features of the UAV. The computing device may be configured to control the operation of the various systems of the UAV in order to complete a mission. In addition, the computing device may receive sensor feedback from the plurality of sensors and transmit the sensor feedback to the server computing devices.

The sensor feedback may be used to estimate a baseline of acceptability for nominal operation of the various features of the same or similarly equipped UAV. Once a baseline is established, the baseline may be used to identify situations in which there is an actual problem or failure at a UAV. From this review, trends and corresponding thresholds may be identified which can be used to flag potential problems in other UAVs. These thresholds may be hand-tuned using the baseline.

In addition or alternatively, one or more models may be generated and stored in the storage system. These models may be used in order to identify current and predicted conditions for a given UAV. Thus, for any sensor feedback input into the model, the model may provide output indicating likely problem conditions that the UAV is experiencing or will experience.

As a UAV flies around, it may periodically or continuously send sensor feedback to the server computing devices. This sensor feedback may be received by the server computing devices and used to update the information about that particular UAV in the storage system. In addition, the server computing devices may use the sensor feedback, thresholds and/or model or models to determine whether the done is currently experiencing or likely to experience a problem condition.

For each identified problem condition, the server computing devices may determine an appropriate response. These mitigation responses may be identified by a human operator based on prior experiences with other UAVs experiencing similar problems as well as safety and other considerations. For minor problem conditions, the UAV may simply be "flagged" by the server computing devices for inspection in order to determine whether all or part of the UAV should be replaced at a later time. For critical problem conditions, in addition to flagging the UAV for inspection, determine UAV may be brought to the ground immediately for inspection. For problems that lie somewhere between minor and critical, the server computing devices may determine whether the UAV should continue on its current flight pattern and complete a current mission or return to a service area or base, again based on the information in the lookup table. In addition, the sensor feedback and/or model or models may also be used to estimate an appropriate remaining flight time and/or distance for the UAV given any or each identified problem condition.

In some instances, where a change in the behavior of the UAV is required, once an appropriate response is determined, this information may be sent by the server computing devices to the computing device of the UAV. The UAV may respond by acting on that response.

The features described herein may allow for more effective and efficient management for a group of multiple UAVs. For instance, the system may be able to make useful determinations and predictions about current and expected failures of different features or systems of a UAV. This may allow human operators to more quickly identify and address problem conditions, such as battery, motor, or propeller failures or anomalies even while the UAV is in flight. Moreover, because the determination is performed remotely from the UAV, the UAV's computing device need not have the additional processing power and data stored locally at the UAV required to make such determinations. As a result, this may improve battery functionality and overall flight times across the group of UAVs and thereby increasing the safety and reliability of the UAVs.

Aspects, features and advantages of the disclosure will be appreciated when considered with reference to the foregoing description of embodiments and accompanying figures. The same reference numbers in different drawings may identify the same or similar elements. Furthermore, the following description is not limiting; the scope of the present technology is defined by the appended claims and equivalents.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling a payload or package. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1A illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
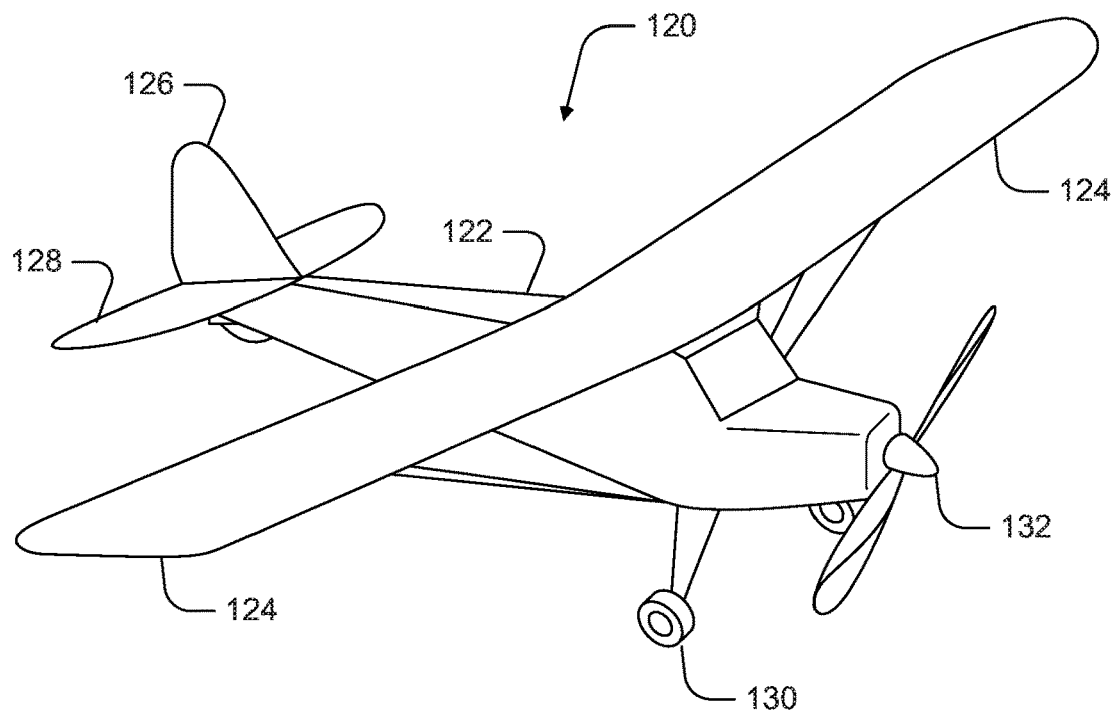

Similarly, FIG. 1B shows another example of a UAV 120. The UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
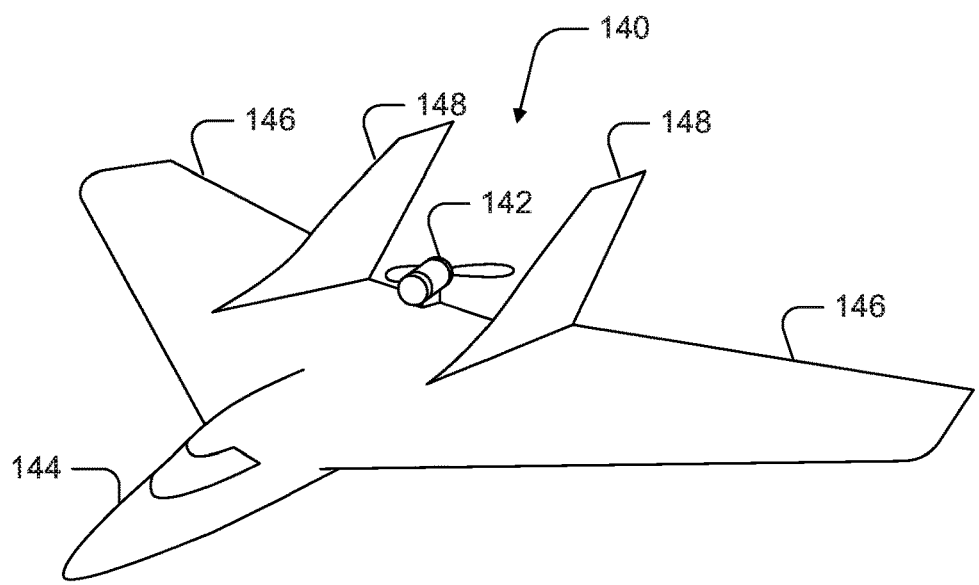

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
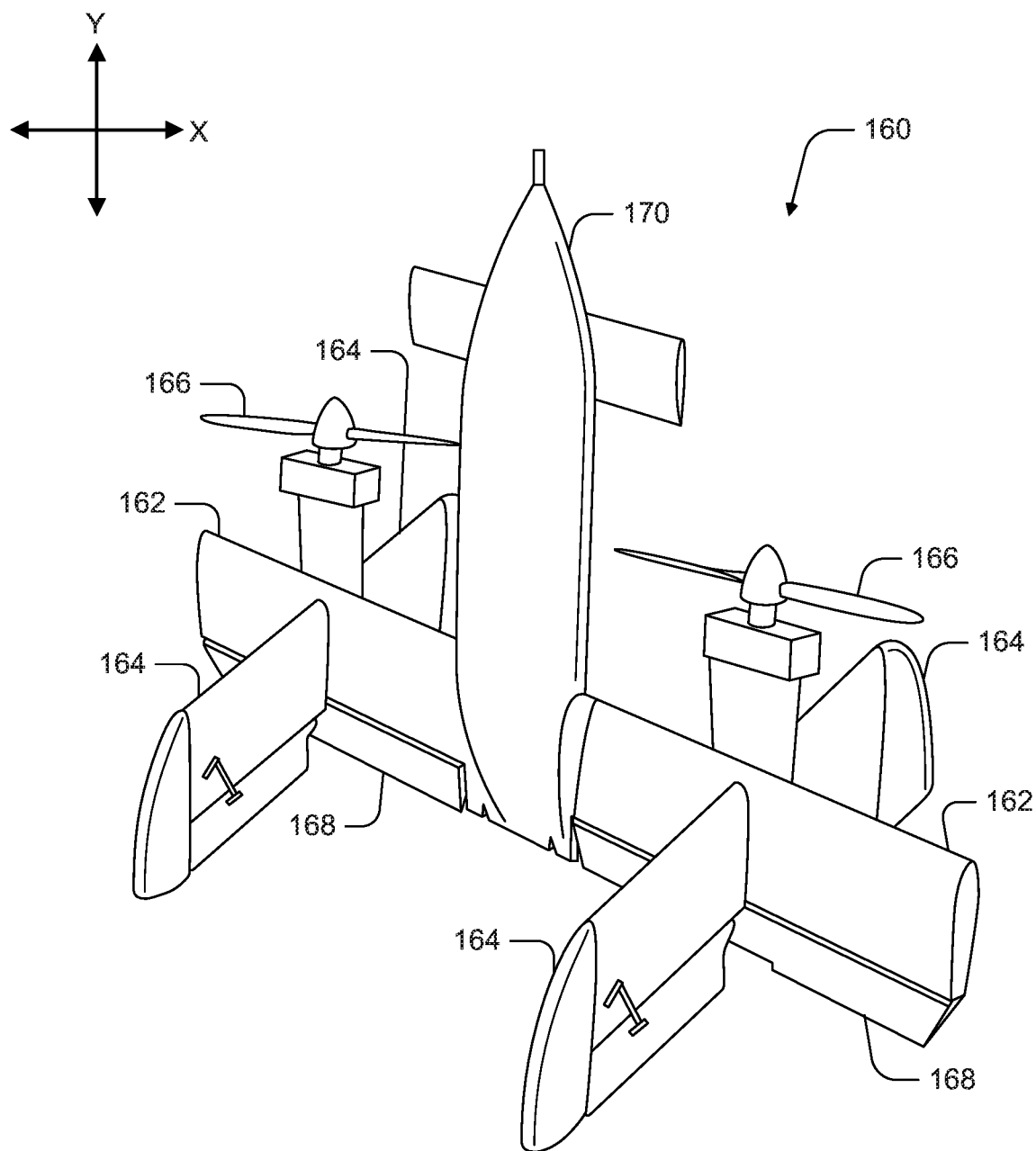

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own. For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Figure 1E:
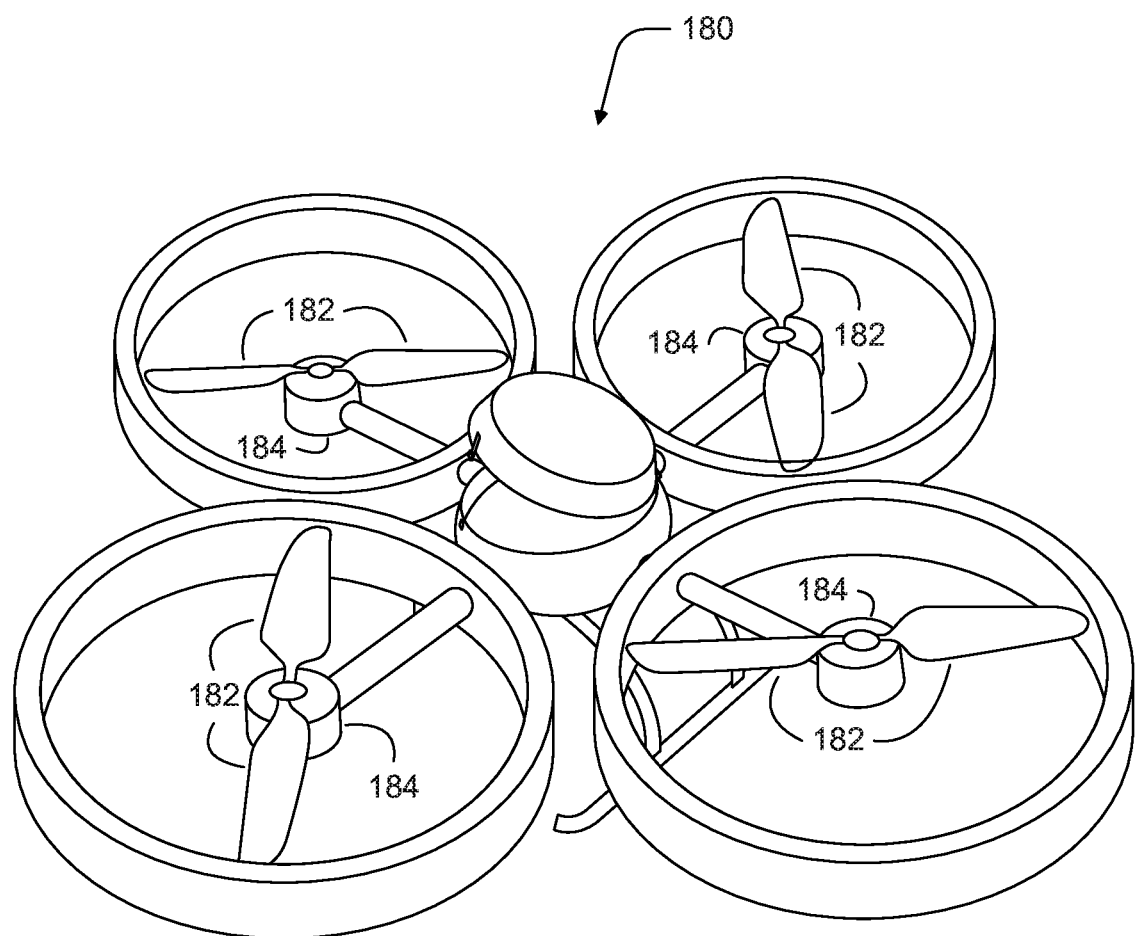

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible. As noted above, some embodiments may involve other types of UAVs, in addition to or in the alternative to fixed-wing UAVs. For instance, FIG. 1E shows an example of a rotorcraft that is commonly referred to as a multicopter UAV 180. The UAV 180 may also be referred to as a quadcopter, as it includes four rotors 182. It should be understood that example embodiments may involve a rotorcraft with more or fewer rotors than the UAV 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the UAV 180 in greater detail, the four rotors 182 provide propulsion and maneuverability for the UAV 180. More specifically, each rotor 182 includes blades that are attached to a motor 184. Configured as such, the rotors 182 may allow the UAV 180 to take off and land vertically, to maneuver in any direction, and/or to hover. Further, the pitch of the blades may be adjusted as a group and/or differentially, and may allow the UAV 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

Figure 2:
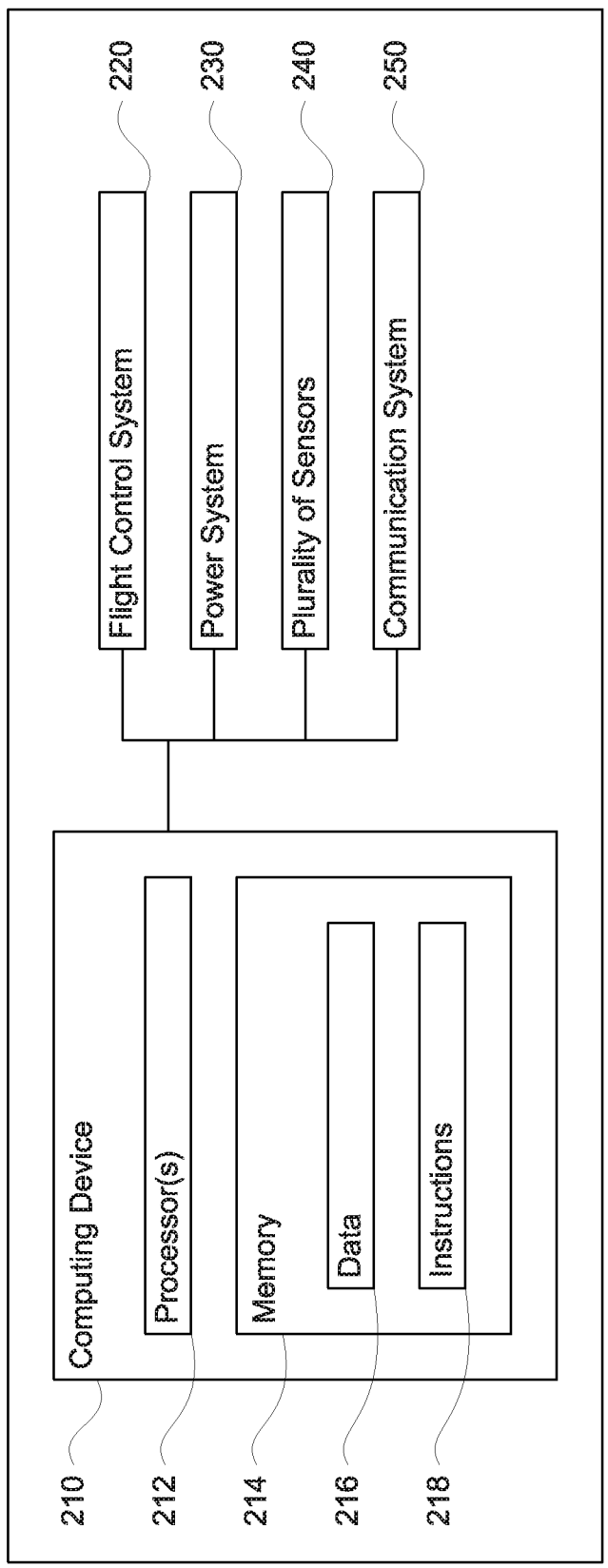
FIG. 2 is an example functional diagram of a UAV in accordance with aspects of the disclosure.

FIG. 2 is an example functional diagram of a UAV 200 which may correspond to any of the UAVs of a group of UAVs, including any of UAVs 100, 120, 140, 160, 180. In this example, the UAV 200 includes a computing device 210 including a processor 212 and memory 214 storing data 216 and instructions 218. Such processors, memories, data and instructions may be configured similarly to one or more processors 312, memory 314, data 316, and instructions 318 of computing device 310 discussed further below. In addition, the UAV 200 includes a flight control system 220, a power system 230, a plurality of sensors 240, and a communication system 250.

For any of the aforementioned example configurations of UAVs, each of the features of the motors, shafts, propellers, rotors, flaps, etc. may all be part of the flight control system 220. Operation of the flight control system 220 may be controlled by the computing devices 210 in order to maneuver the UAV 200, for instance, by controlling the altitude, pitch, speed, direction, etc. of the UAV.

The power system 230 may include at least one battery which can provide current to a motor in order to rotate a shaft for a propeller or pivot one or more flaps. Of course, two or more batteries may be useful in the event of an unexpected failure of one battery or to be able to increase the power to the motor or motors for short periods of time in order to accomplish the aforementioned flying maneuvers. Each battery may also include plurality of cells, such as two or more, and may be configured to provide power to the various systems of the UAV 200, including, for instance, the computing device 210 and the flight control system 220. In addition, operation of the power system 230 may be controlled by the computing devices 210 in order to maneuver the UAV.

The plurality of sensors 240 may be located throughout the UAV 200 in order to generate data or sensor feedback from different locations and features of the UAV and forward this information to the computing device 210. In this regard, sensor feedback may refer to "raw sensor data" or data processed by the sensor or computing device 210. For instance, each battery of the power system 230 may include a plurality of sensors configured to detect the current, voltage, temperature, and state of charge of each cell of that battery. As another example, a sensor, such as a MEMS accelerometer, may be used to detect vibrations at different parts of a UAV, such as at a motor, propellers, flaps, etc. Sensors may also be used to determine the temperature of each propeller, temperature of each motor, power consumption by each motor, as well as the power consumption by a controller of the UAV. Microphones may be used to record the sounds made by the motors and or propellers. Other sensors may include an accelerometer, a gyroscope to detect relative orientation, a GPS receiver, an altimeter, a humidity sensor, a speedometer, a wind speed sensor, propeller speed sensors (relative and absolute), etc. Thus, sensor feedback may include information generated by all or any of the plurality of sensors 240.

The computing device 210 may be configured to control the operation of the various systems of the UAV 200 in order to complete a mission. For instance, the computing device 210 may use the data and instructions of memory 214 as well as feedback from some of the sensors to control the features of the flight control system 220 and power system 230 in order to follow a flight plan of a mission. In this regard, the instructions may allow the UAV 200 to operate autonomously using aerial maps and mission information stored the data of memory 214.

The communication system 250 may include for instance, a network interface device, such as a transmitter and/or receiver which enables the UAV to communicate with other computing devices, such as computing devices 310 and/or other computing devices via a network, such as network 350 discussed further below. For instance, the computing device 210 may receive sensor feedback from the sensors of the plurality of sensors 240, and transmit the sensor feedback, for instance via a transmitter of the communication system 250, to a remote server computing device, such as the server computing devices 310 discussed further below. In some instances, this information may be downloaded directly from the sensors and/or computing device 210 to the server computing devices 310 and or computing device 320 when the UAV 200 is not in use.

Figure 3A:
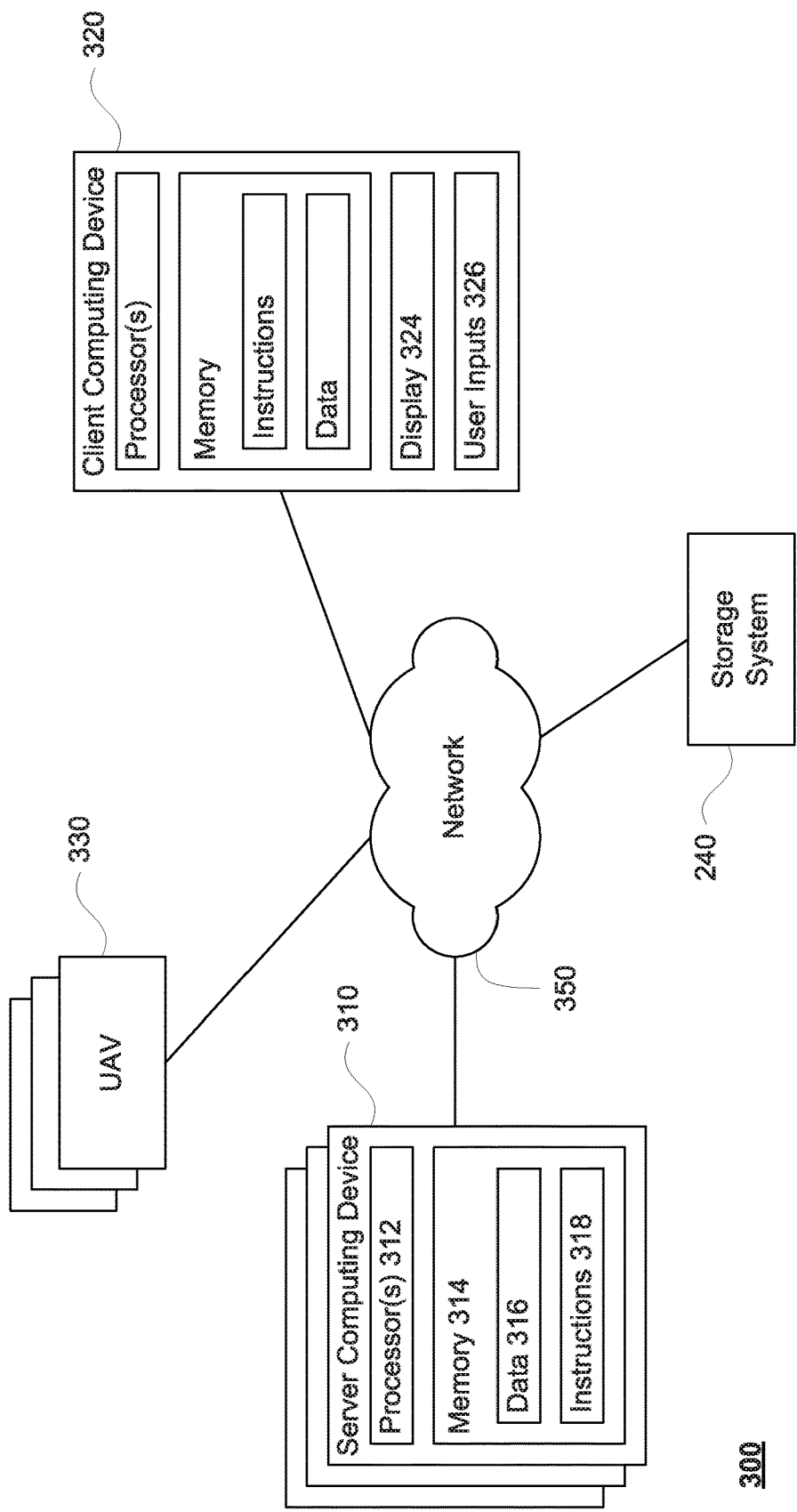
FIG. 3A is an example functional diagram of a management system for managing a group of UAVs in accordance with aspects of the disclosure.
Figure 3B:
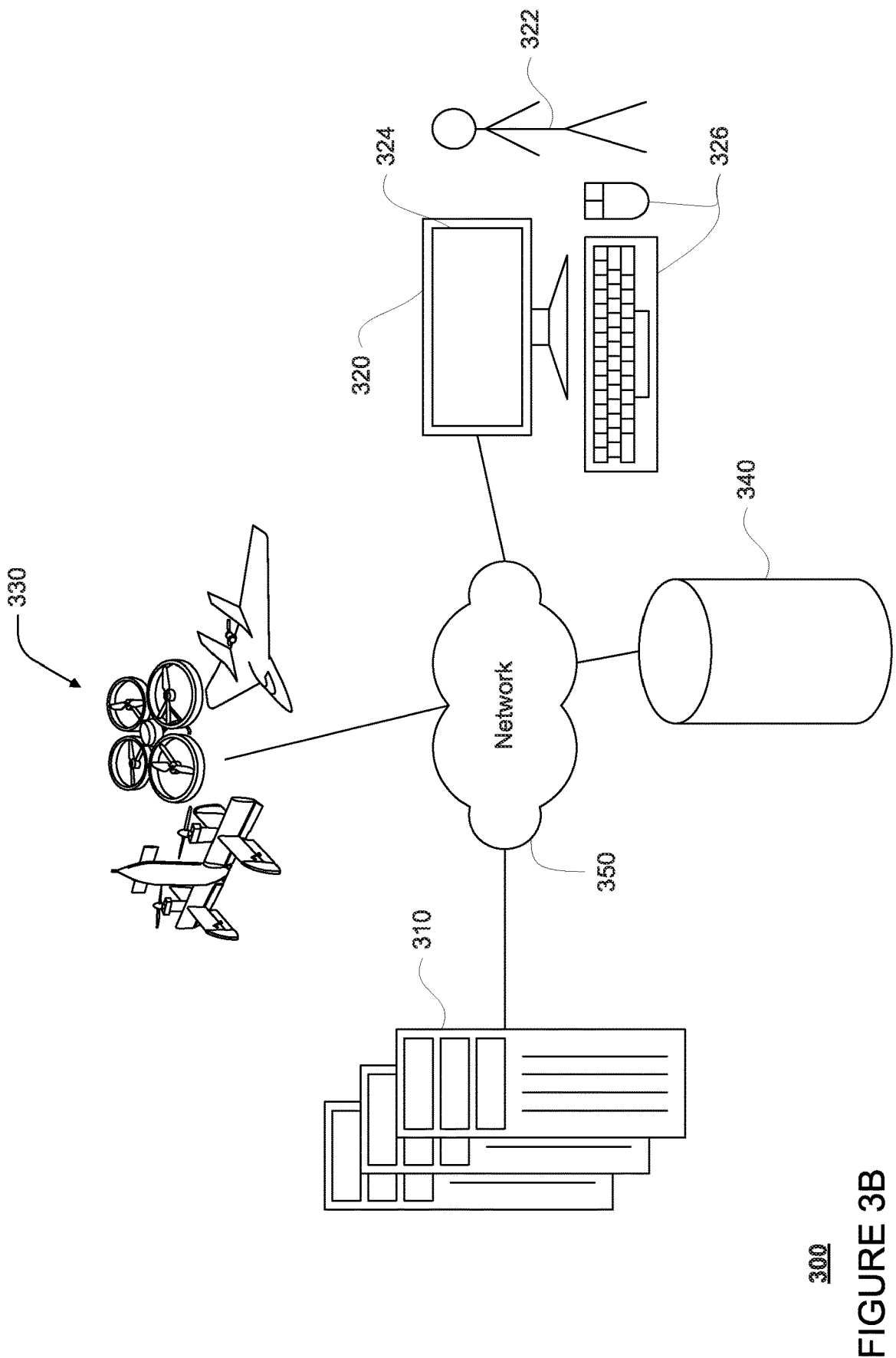
FIG. 3B is an example pictorial diagram of a management system for managing a group of UAVs in accordance with aspects of the disclosure.

FIGS. 3A and 3B are functional and pictorial diagrams, respectively, of an example management system 300 for managing a group of multiple UAVs. The management system includes computing devices 310, 320, a group of UAVs 330, and a storage system 340 connected via a network 350. Although only a few UAVs and computing devices are depicted for simplicity, a typical system may include significantly more.

Computing devices 310 include one or more processors 312, memory 314, and other components typically present in general purpose computing devices. The memory 314 stores information accessible by the processor 312, including data 316 and instructions 318 that may be executed or otherwise used by the processor 312. The memory 314 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 316 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 318 may be retrieved, stored or modified by processor 312 in accordance with the instructions 316. For instance, although the claimed subject matter is not limited by any particular data structure, the data may be stored in computing device registers, in a relational database as a table having a plurality of different fields and records, XML documents or flat files. The data may also be formatted in any computing device-readable format.

The processor 312 may be any conventional processors, such as commercially available CPUs. Alternatively, the one or more processors may be a dedicated device such as an ASIC or other hardware-based processor. Although FIG. 3A functionally illustrates the processor, memory, and other elements of computing devices 310 as being within the same block, it will be understood that the processor, computing device, or memory may actually include multiple processors, computing devices, or memories that may or may not be stored within the same physical housing. For example, memory may be a hard drive or other storage media located in a housing different from that of computing devices 310. Accordingly, references to a processor or computing device will be understood to include references to a collection of processors or computing devices or memories that may or may not operate in parallel.

Computing devices 310 may also include one or more wireless network connections to facilitate communication with other computing devices, such as the client computing device 320 and the computing devices 210 of the UAVs of the group. As an example, the computing devices 310 may receive information from the UAVs of the group and send instructions to the UAVs as discussed further below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The network 350, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 310 may include one or more server computing devices having a plurality of computing devices, e.g., a load balanced server farm, that exchange information with different nodes of a network for the purpose of receiving, processing and transmitting the data to and from other computing devices. For instance, one or more computing devices 310 may include one or more server computing devices that are capable of communicating with the computing device 320 as well as computing devices of the group of UAVs 330 via the network 350. For example, any of UAVs 100, 120, 140, 160, 180 may be a part of the group of UAVs 330, the operation of which may be determined and controlled by the server computing devices. In this regard, the server computing devices 310 may function as a management system for the group of UAVs.

As such, the server computing devices 310 may be configured to generate and assign missions to the group of UAVs 330. Each mission may include a flight plan may include a path identifying where the UAV should fly as well as corresponding maneuvers, such as changing directions, hovering, etc. Each mission may also include one or more tasks, such as picking up or delivering payloads or packages. In addition, the UAVs of the group may periodically send the server computing devices information relating to the status of the UAVs discussed further below, and the one or more server computing devices may use to update or change the information of the storage system 340.

In addition, server computing devices 310 may use network 350 to transmit and present information to a human operator, such as human operator 322 on a display, such as displays 324 of computing devices 320. In this regard, computing device 320 may be considered client computing device. Again, although only a single client computing device is shown, the system 300 may include many more.

As shown in FIG. 3B, client computing device 320 may be a personal computing device intended for use by a human operator 322 and have all of the components normally used in connection with a personal computing device including one or more processors (e.g., a central processing unit (CPU)), memory (e.g., RAM and internal hard drives) storing data and instructions, a display such as display 324 (e.g., a monitor having a screen, a touch-screen, a projector, a television, or other device that is operable to display information), user inputs 326 (e.g., a mouse, keyboard, touchscreen or microphone), speakers, a network interface device, and all of the components used for connecting these elements to one another. In some examples, client computing device 320 may be a work station used by an administrator or human operator to access and/or manipulate information for the group of UAVs 330. Again, such processors, memories, data and instructions of the client computing device 320 may be configured similarly to one or more processors 312, memory 314, instructions 316, and data 318 of computing devices 310.

Although the client computing device 320 may be a full-sized personal computing device, it may alternatively be a mobile computing device capable of wirelessly exchanging data with a server over a network such as the Internet. By way of example only, client computing device 320 may be a mobile phone or a device such as a wireless-enabled PDA or cellular phone, a tablet PC, a wearable computing device or system, or a netbook that is capable of obtaining information via the Internet or other networks. In another example, client computing device 320 may be a wearable computing system, shown as a wristwatch or head-mounted computer. As an example the user may input information using a small keyboard, a keypad, microphone, using visual signals with a camera, or a touch screen.

As with memory 314, storage system 340 can be of any type of computerized storage capable of storing information accessible by the server computing devices 310, such as a hard-drive, memory card, ROM, RAM, DVD, CD-ROM, write-capable, and read-only memories. In addition, storage system 340 may include a distributed storage system where data is stored on a plurality of different storage devices which may be physically located at the same or different geographic locations. Storage system 340 may be connected to the computing devices via the network 350 as shown in FIGS. 3 and 2, and/or may be directly connected to or incorporated into any of the computing devices 310 or 320 or the computing devices of the group of UAVs 330.

Storage system 340 may store various types of information as described in more detail below. This information may be retrieved or otherwise accessed by a server computing device, such as one or more server computing devices 310, in order to perform some or all of the features described herein. For instance, the storage system 340 may store data, such as status information for each UAV of the group, aerial maps, and outstanding tasks (i.e. package locations and destinations), that can be used to generate mission information including flight plans and corresponding tasks. In addition, the storage system 340 may store baseline information, thresholds, models, mitigation responses, and other data accessible by the server computing devices 310 as discussed further below.

For instance, sensor feedback generated by the plurality of sensors 240 of the UAVs of the group of UAVs 330 may be used to estimate a baseline of acceptability for nominal operation of the various features of the same or similarly equipped UAV. This baseline may be developed by recording sensor feedback from the plurality of sensors 240 from various UAVs of the group of UAVs 330 as they fly around. In other words, this baseline may be established using historical data for UAV missions. For instance, a baseline may be established by comparing historical data with historical failures and detecting problem data points that require action out of the vast number of data points that require no action. In this regard, different UAV configurations, such as each of UAV 100, 120, 140, 160, and 180, may require different thresholds. As noted above, these baseline or baselines may be stored in the storage system 340.

Once a baseline is established, the baseline may be used to identify situations in which there is an actual problem or failure at a UAV. This may involve manual review of a UAV to identify specific problems, and reviewing the sensor feedback from that UAV to identify the characteristics of the sensor feedback indicative of the specific problem.

From this review, trends and corresponding thresholds may be identified which can be used to flag potential problems in other UAVs. These thresholds may be hand-tuned using the baseline. For instance, thresholds may correspond to a standard deviation or percentage from a nominal expected value such as a mean observed value for other similarly situated UAVs (such as those under similar flight profiles, flight speeds, weather conditions, age, prior flight time, configurations, etc.). As an example, if a battery cell is discharging 5% or more faster than the threshold value, this may indicate that the battery cell (and/or the battery) has a problem or will be likely to fail soon (for instance, within a few minutes or hours of flight time). Similarly, if the temperature of the motor or battery cell is greater than a threshold, this may indicate that the given UAV is likely to have failure at the motor or battery cell.

In some instances, the thresholds may relate to deviations between sensor feedback from different features of the same UAV generated at or at approximately the same time. For instance, if two battery cells of a given UAV are discharging at different rates, and the difference is greater than a threshold, this may also indicate a problem with the battery cells.

In other instances, many sensor feedback values would need to be combined, such as by adding or examining sensor feedback from a sensor of the plurality of sensors at different points in time, in order to compare the sensor feedback to a threshold. As such, sensor feedback collected at different points in time may be compared to a threshold and not only instantaneous values. For instance, gradual increase in long-term yaw integrator state can imply a worn aerodynamic surface, an increase in battery resistance or cell imbalance can imply a bad battery, or gradual erosion of battery margins can imply a number of possible problem conditions with the battery. Each of these problem conditions is more easily identified with a plurality of sensor feedback data captured at different points in time. For instance, some thresholds may include a threshold value for some minimum duration or period of time that is found to have few enough false positives and a large enough fraction of positives for actual or potential problems. As such, combinations of sensor feedback values, for instance, battery temperature and discharge rate, may better narrow down the identification of a problem condition.

Once stored in the storage system 340, these thresholds may be used to determine actual or potential problem conditions for a UAV. As an example, a portion of the sensor feedback from a given UAV may be compared to a predetermined threshold in order to estimate a possible condition of the UAV, such as a particular problem or expected failure. More detailed comparisons involving a plurality of thresholds used to identify patterns or combinations of different states likely to indicate a possible problem or expected failure of the given UAV may also be used. For instance, a particular pattern of vibrations or sounds at a propeller may indicate that the propeller is chipped, broken, or not properly secured to the driveshaft for the propeller. Similarly, a particular pattern of vibrations or sounds at a motor may indicate that a gear of the motor is broken or the motor is not properly secured to a body of the given UAV.

In addition or alternatively, one or more models may be generated and stored in the storage system 340. These models may be used in order to identify current and predicted conditions for a given UAV. The model or models may include one or more machine learning models generated using the sensor feedback from a plurality of UAVs with labels identifying whether the UAV was operating normally or whether the UAV had some sort of problem condition. These "problem condition" labels may at least at first be manually applied to the sensor feedback by a human operator, for instance using computing device 320. The input may even include additional information not necessarily received from a UAV, such as weather information.

Thus, for any sensor feedback input into the model, the model may provide output indicating likely problem conditions that the UAV is experiencing or will experience. For instance, the output may include a list of possible problem conditions such as battery cell failure or anomaly (current or expected), worn propeller, chipped or broken propeller, not properly secured propeller, improperly tuned motor, motor failure or anomaly (current or expected), stuck propeller, worn or broken aerodynamic surfaces (such as main or primary wing or tail/ailerons), loose structural members, board failures or anomalies, etc. , and a likelihood of each such condition. If any of these possible conditions are greater than a threshold, such as 50% or more or less, the server computing devices 310 may determine that the condition exists or will shortly exist. In some instances, the output may also indicate how likely the UAV is to be operating under nominal conditions.

To better train the model, in some instances, batteries or other UAV systems may be run and the corresponding sensor feedback monitored "off line" that is in a test environment without requiring an actual UAV flight. In addition or alternatively, one or more UAVs may fly "checkout flights" or other custom missions that may be used to evaluate a number of different types of maneuvers and control pathways as well as sensor feedback from the plurality of sensors.

Again the sensor feedback generated may be used to tune the thresholds and/or train the model.

Figure 4:
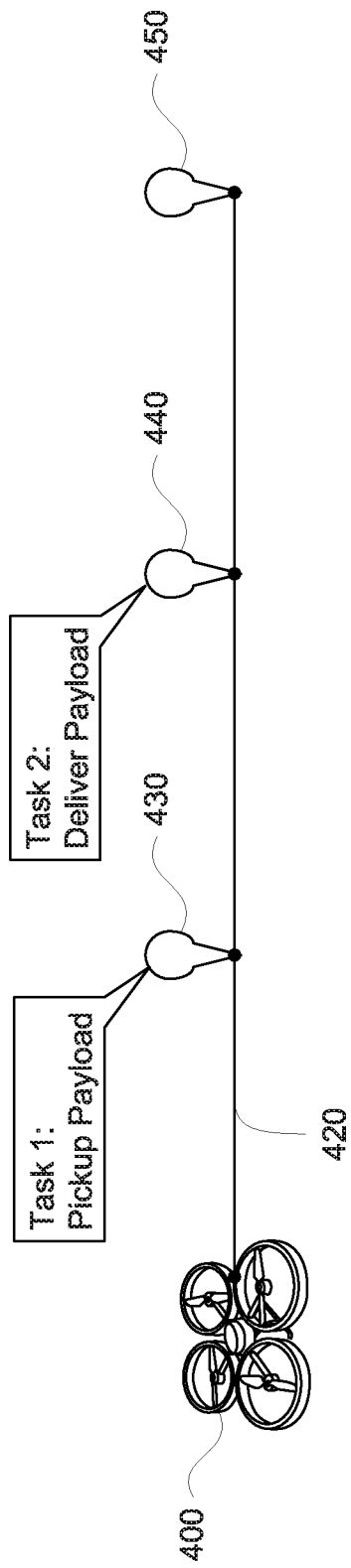
FIG. 4 is an example representation of a UAV flying a mission in accordance with aspects of the disclosure.

FIG. 4 represents an example of a UAV, here UAV 400, flying a mission 410. UAV 400 may represent any of the UAVs of group of UAVs 330, such as any of UAVs 100, 120, 140, 160, or 180, and therefore may be configured the same as or similarly to the example of UAV 200. The details of the mission, including flight path, flight plan, and tasks may have been generated and provided to computing device 310 of the UAV 400 by the server computing devices 310 or one or more other computing devices, such as by computing device 320 being operated by human operator.

The mission 410 includes following flight path 420 to reach a destination 450. The mission also includes performing tasks at locations 430 and 440. As an example, the task for location 430 may include picking up a payload (or package) at location 430, and the task for location 440 may include delivering the payload at location 440. Each of these tasks may require that the UAV 400 hover for at least some period of time in order to complete the respective task. In other words, the UAV 400's flight plan may include hovering or maintaining its relative position while picking up and delivering the payload. Alternatively, rather than hovering to complete each task, the flight plan may include landing at location 430 and/or 440.

As the UAV 400, flies along flight path 420, the plurality of sensors 240 of UAV 400 may generate sensor feedback. This sensor feedback may be received by the UAV' s computing device 210. The computing device 310, in turn, may periodically or continuously send sensor feedback to the server computing devices 310, for instance via network 350. This sensor feedback may be received by the server computing devices 310 and used to update the information about that particular UAV in the storage system 340.

FIG. 5 represents an example of portions of status information 500 for UAVs of the group 330 that may be stored and updated in the storage system 340. As shown in the example, the status information may include current or last reported location information (for instance generated from information from a GPS receiver of the UAV), mission information (such as whether the UAV is currently assigned a mission), the status of that mission (such as the number of remaining tasks), time of last received sensor feedback update, whether the UAV has been flagged for inspection as discussed further below, and so on. Examples of other information that may be stored in the storage system 150 for each UAV and updated may include other sensor feedback such as battery status information (such as the current, voltage, temperature, and state of charge of each cell of each battery), vibrations recorded at different parts of the UAV, temperature of each propeller, temperature of each motor, power consumption by each motor, as well as the power consumption by a controller of the UAV, sounds made by the motors and or propellers, relative orientation, relative pitch, humidity data from a humidity sensor, speed, wind speed measurements, propeller speed measurements (relative and absolute), etc.

In addition, the server computing devices 310 may use the sensor feedback received from UAV 400 (while in flight on mission 410) to determine whether the UAV 400 is currently experiencing or likely to experience a problem condition. As noted above, this determination may include comparing the sensor feedback to one or more thresholds of the storage system 340 to determine whether the UAV 400 is currently experiencing or likely to experience in the future a problem condition. In addition or alternatively, the sensor feedback may be input into the aforementioned model or models in order to identify the likelihood of the UAV currently experiencing or likely to experience in the future a problem condition. In some instances, this information may also be compared to a threshold to identify current or potential future problem conditions for the UAV 400.

For each identified problem condition, the server computing devices 310 may determine an appropriate response. These mitigation responses may be predetermined, for instance, and stored in a lookup table or database of storage system 340 as noted above. For instance, example table 600 of FIG. 6 is an example look up table that identifies problem conditions by condition identifiers (IDs), severity of those condition IDs, as well as various mitigation responses. In this example, the condition IDs (001-005) may represent different types of problem conditions such as battery cell failure or anomaly (current or expected), worn propeller, chipped or broken propeller, not properly secured propeller, improperly tuned motor, motor failure or anomaly (current or expected), stuck propeller, worn or broken aerodynamic surfaces (such as main or primary wing or tail/ailerons), loose structural members, board failures or anomalies, etc. The mitigation responses may be identified by a human operator, such as human operator 322 or another human operator, based on prior experiences with other UAVs experiencing similar problems as well as safety and other considerations. As an example, for certain problem conditions which indicate current or expected failures or problems, the server computing devices 310 may determine how to best mitigate that condition by referring to the look up table. Alternatively, the model or models may also output an appropriate mitigation response.

As indicated in the example table 600, for minor problem conditions, the UAV may simply be flagged by the server computing devices 310 for inspection in order to determine whether all or part of the UAV should be replaced at a later time. As an example, flagging may refer to adding a flag or other notification to the data for that UAV in the storage system 340. For instance, if one of a plurality of battery cells of the UAV 400's power system 230 has a high discharge rate which would indicate a failure of that cell, but all other cells are functioning normally and prior UAVs with this problem were able to continue to fly without incident, the failure of that cell may be considered a minor problem condition. In this regard, the UAV 400 may simply be flagged by the server computing devices 310 for inspection. Of course, this may change as new or updated sensor feedback is received from the UAV 400 during mission 410.

However, for critical problem conditions, in addition to flagging the UAV for inspection, the server computing devices 310 may refer to the example table 600 and determine UAV may be brought to the ground immediately in order to allow for inspection. In this regard, any mission assigned to the UAV may effectively be aborted and reassigned to another UAV if needed. For instance, if an entire battery is expected to fail or a particular vibration pattern or other anomaly indicates that a propeller is expected to come loose and other UAVs have crashed or fallen down as a result of similar situations, this may be considered a critical problem condition. In response, the UAV 400 may be flagged for inspection by the server computing devices 310, and the server computing devices 310 may identify the mitigation response as landing the UAV immediately. Again, the assigned mission may be aborted for that UAV and reassigned to another UAV of the group of UAVs 330 if needed.

For moderate problem conditions that lie somewhere between minor and critical, the server computing devices 310 may determine whether the UAV should continue on its current flight pattern and complete a current mission and any tasks or return to a service area or base, again based on the information in the lookup table. For example, the server computing devices 310 may determine whether the UAV 400 should complete the tasks at locations 440 and 450, proceed directly to the destination 450 without completing the tasks, or proceed to a different location, such as an inspection location or a landing location closer to the UAV 400's current location than the destination 450. This identification of a different location may be distance based for safety reasons. In other words, the server computing devices 310 may select the most efficient landing location for. In addition, the location may be identified such that the UAV 400 will have a certain amount of power left in the batteries of the power system 230 when it reaches the final destination or the different location.

In addition, the sensor feedback and/or model or models may also be used to estimate a remaining flight time or distance for the UAV given any or each identified problem condition. For an example, the server computing devices 310 can make determinations about how much power the UAV 400 is currently using based on the sensor feedback and estimate how much time or how many specific maneuvers the UAV 400 will be able to make versus flying in a particular direction and/or whether the UAV should land immediately in its current location.

For instance, the UAV 400 may require so much power to reach the destination 450 from the UAV's current location. Based on how much power is required for the UAV to hover, the server computing devices 310 may determine that the UAV 400 will be able to hover no more than 2 minutes if it is going to be able to reach the destination 450 with a minimum allowable battery level. In this example, if the mission 410 requires the UAV 400 to hover only for 1 minute to complete the task at location 440 and for 1 minute to complete the task at location 450, the server computing devices 310 may determine that the UAV is able to complete the mission. If the mission 410 requires the UAV 400 to hover at location 440 for 2 minutes to complete the task at location 450 and for 1 minute to complete the task at location 450, the server computing devices 310 may determine that the UAV is able to complete only one of the two tasks for the mission 410. In some instances, server computing devices 310 may determine that if the UAV 400 is only able to complete one of the two tasks, the server computing devices 310 may even determine that the UAV should not complete either task, and the mission 410 should be assigned to another UAV of the group. Again, these critical determinations may be made by the server computing devices 310 and not at the UAVs themselves which can be especially important when the UAV is experiencing a problem condition which might prevent accurate determinations of such information.

Other similar determinations may be made for other types of maneuvers, such as loops, etc. as well as combinations of maneuvers, such as 1 loop and 2 minutes of hovering, etc. where the UAV is currently or expected to experience a problem condition.

In some instances, where a change in the behavior of the UAV is required, once an appropriate response is determined, this information may be sent by the server computing devices 310 to the computing device 210 of the UAV 400. The UAV may respond by acting on that response. For instance, the computing device 310 may control the UAV 400 autonomously in order to land immediately, cancel or change the UAV's mission, change or completely replace the UAV's flight plan or flight path, add and/or removing tasks from the UAV's mission, changing the state of the UAV once it has landed to disallow further takeoffs until the UAV received confirmation that an inspection has been performed, etc. In this regard, the UAV is able to automatically respond to a problem condition, actual or expected, identified by the server computing devices 310 without requiring the actions of a human operator to make the determination about problem condition or decide how to respond to the problem condition while the UAV is in mid-flight.

The thresholds and/or model or models may even be used to provide estimations relating to how the conditions would be expected to affect future flights for a particular UAV. For instance, the model or models may also output estimates for how long the UAV has to continue flying, for instance how many hours or what maximum physical distance, before an expected condition occurs assuming such information is also used to train the model. Alternatively, two or more different threshold values may be used to estimate different expected flight times. For instance, if a battery cell is discharging 5% or more or less faster than the expected rate, the flight time may be reduced by 10% or more or less, whereas if the battery cell is discharging 10% or more or less faster than the expected rate, the flight time may be reduced by 20% or more or less. These estimations may even be made based on specific flight patterns, assuming such information is used to determine the thresholds and/or generate the model.

Although the examples herein relate to UAVs, the features described herein are applicable to any number of different systems, such as manned aerial vehicles which may operate autonomously to transport passengers and/or cargo as well as other autonomous vehicles like cars, trucks, busses, trains, boats, submarines, aerial drones sized to carry passengers, etc. which may be difficult to reliably monitor in real time by a human operator. As an example, the group of UAVs 330 may include all or some manned aerial vehicles and/or all or some UAVs.

Figure 7:
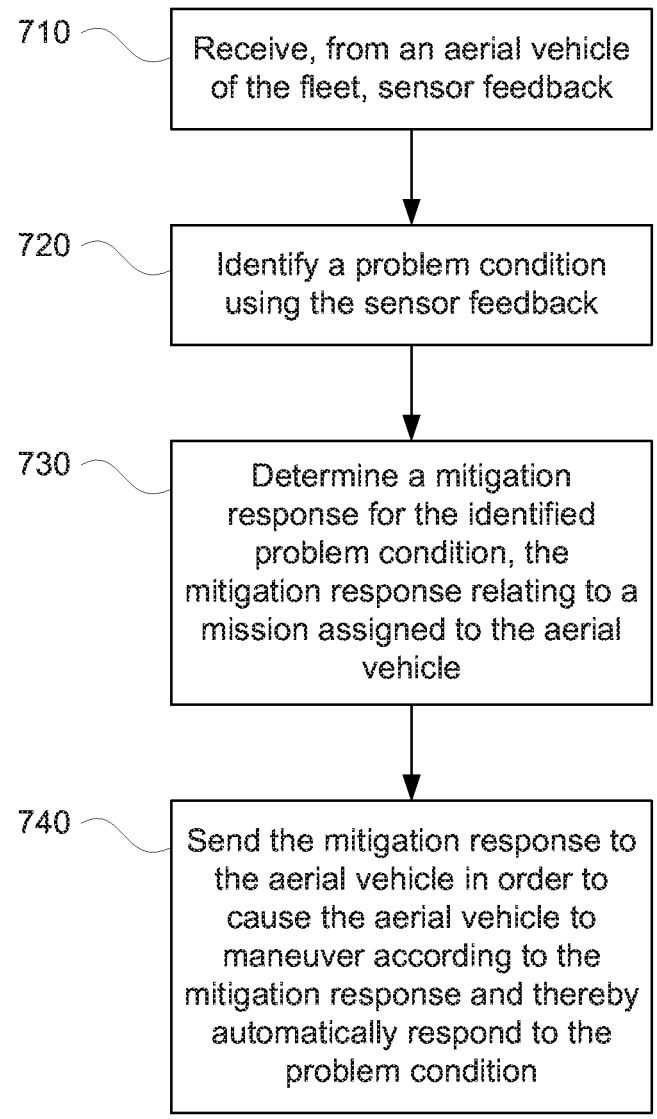
FIG. 7 is an example flow diagram in accordance with aspects of the disclosure.

FIG. 7 is an example flow diagram 700 relating to identifying and responding to problem conditions for a group of aerial vehicles. As an example, the blocks of which may be performed by one or more processors of one or more computing devices such as processors 320 of server computing devices 310. At block 710, sensor feedback is received from an aerial vehicle of the group. At block 720, this sensor feedback is used to identify a problem condition. At block 730, a mitigation response is determined for the problem condition, the mitigation response relating to a mission assigned to the aerial vehicle. At block 740, the mitigation response may be sent to the aerial vehicle in order to cause the aerial vehicle to maneuver according to the mitigation response and thereby automatically respond to the problem condition.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for identifying and responding to problem conditions for a plurality of aerial vehicles, the system comprising one or more processors configured to:
receive, from an aerial vehicle of the plurality of aerial vehicles, sensor feedback;
generate, using one or more supervised machine learning (ML) models and based on the sensor feedback, (i) a plurality of likelihood values corresponding to a plurality of possible problem conditions, wherein each respective likelihood value of the plurality of likelihood values indicates a likelihood of the aerial vehicle experiencing a corresponding problem condition of the plurality of possible problem conditions and (ii) a plurality of remaining flight metrics corresponding to the plurality of possible problem conditions, wherein each respective remaining flight metric of the plurality of remaining flight metrics is specific to the aerial vehicle experiencing a corresponding problem condition of the plurality of possible problem conditions, and wherein each of the one or more supervised ML models has been trained using training data generated by the plurality of aerial vehicles having a plurality of different physical configurations that differ from one another by at least one physical component;
identify, for the aerial vehicle, a particular problem condition of the plurality of possible problem conditions based on comparing (i) the plurality of likelihood values corresponding to the plurality of possible problem conditions to (ii) a plurality of threshold values that is specific to a particular physical configuration of the aerial vehicle, wherein the particular physical configuration of the aerial vehicle is one of the plurality of different physical configurations, wherein the plurality of thresholds are based on a subset of the training data corresponding to an aerial vehicle subset of the plurality of aerial vehicles, and wherein each aerial vehicle of the aerial vehicle subset has the particular physical configuration;
determine a mitigation response for the particular problem condition based on (i) a mission assigned to the aerial vehicle and (ii) the remaining flight metric generated by the one or more supervised ML models for the particular problem condition; and
send the mitigation response to the aerial vehicle in order to cause the aerial vehicle to maneuver according to the mitigation response and thereby automatically respond to the particular problem condition.

2. The system of claim 1, further comprising the aerial vehicle, wherein the one or more processors are part of one or more server computing devices remote from the aerial vehicle, and wherein the aerial vehicle is an unmanned aerial vehicle.

3. The system of claim 1, wherein each respective remaining flight metric comprises a remaining flight time for the aerial vehicle.

4. The system of claim 1, wherein each respective remaining flight metric comprises a remaining flight distance for the aerial vehicle.

5. The system of claim 1, wherein the particular problem condition corresponds to a current problem with the aerial vehicle.

6. The system of claim 1, wherein the particular problem condition corresponds to an expected future problem with the aerial vehicle.

7. The system of claim 1, wherein identifying the particular problem condition comprises:
determining whether a likelihood value corresponding to the particular problem condition exceeds a corresponding threshold value of the plurality of threshold values, wherein the corresponding threshold value is associated with the particular problem condition.

8. The system of claim 1, wherein the one or more processors are further configured to, after identifying the particular problem condition, flagging the aerial vehicle for inspection.

9. The system of claim 1, wherein the one or more processors are further configured to determine the mitigation response further based on a severity of the particular problem condition.

10. The system of claim 1, wherein the particular problem condition corresponds to one or more of: (i) a broken propeller, (ii) a battery failure or anomaly, (iii) a motor failure or anomaly, (iv) an improperly secured propeller, (v) an improperly tuned motor, (vi) a stuck propeller, (vii) a worn or broken aerodynamic surface, (viii) a loose structural member, or (ix) a board failure or anomaly.

11. The system of claim 1, wherein the training data comprises a plurality of labeled sensor feedback generated by the plurality of aerial vehicles, wherein each respective labeled sensor feedback of the plurality of labeled sensor feedback is labeled with a corresponding problem condition experienced by a corresponding aerial vehicle by which the respective labeled sensor feedback was generated.

12. The system of claim 1, wherein the one or more supervised ML models are trained to generate (i) the plurality of likelihood values and (ii) the plurality of remaining flight metrics further based on an operating condition of the aerial vehicle, and wherein the one or more processors are further configured to:
determine a value of the operating condition; and
provide the value of the operating condition as input to the one or more supervised ML models.

13. The system of claim 1, wherein the plurality of remaining flight metrics are generated before occurrence of any of the plurality of possible problem conditions, and wherein each respective remaining flight metric of the plurality of remaining flight metrics represents an amount of flight remaining until the corresponding problem condition occurs.

14. The system of claim 1, wherein the one or more supervised ML models are trained to generate the plurality of remaining flight metrics further based on a flight pattern of the aerial vehicle, and wherein the one or more processors are further configured to:

determine a flight pattern assigned to the aerial vehicle; and provide the flight pattern as input to the one or more supervised ML models.

15. The system of claim 1, wherein the mitigation response is determined using at least one ML model.

16. A method of identifying and responding to problem conditions for a plurality of aerial vehicles, the method comprising:

receiving, by one or more processors of one or more computing devices, from an aerial vehicle of the plurality of aerial vehicles, sensor feedback;

generating, by the one or more processors, using one or more supervised machine learning (ML) models, and based on the sensor feedback, (i) a plurality of likelihood values corresponding to a plurality of possible problem conditions, wherein each respective likelihood value of the plurality of likelihood values indicates a likelihood of the aerial vehicle experiencing a corresponding problem condition of the plurality of possible problem conditions and (ii) a plurality of remaining flight metrics corresponding to the plurality of possible problem conditions, wherein each respective remaining flight metric of the plurality of remaining flight metrics is specific to the aerial vehicle experiencing a corresponding problem condition of the plurality of possible problem conditions, and wherein each of the one or more supervised ML models has been trained using training data generated by the plurality of aerial vehicles having a plurality of different physical configurations that differ from one another by at least one physical component;

identifying, by the one or more processors, for the aerial vehicle, a particular problem condition of the plurality of possible problem conditions based on comparing (i) the plurality of likelihood values corresponding to the plurality of possible problem conditions to (ii) a plurality of threshold values that is specific to a particular physical configuration of the aerial vehicle, wherein the particular physical configuration of the aerial vehicle is one of the plurality of different physical configurations, wherein the plurality of thresholds are based on a subset of the training data corresponding to an aerial vehicle subset of the plurality of aerial vehicles, and wherein each aerial vehicle of the aerial vehicle subset has the particular physical configuration;

determining, by the one or more processors, a mitigation response for the particular problem condition based on (i) a mission assigned to the aerial vehicle and (ii) the remaining flight metric generated by the one or more supervised ML models for the particular problem condition; and sending, by the one or more processors, the mitigation response to the aerial vehicle in order to cause the aerial vehicle to maneuver according to the mitigation response and thereby automatically respond to the particular problem condition.

17. The method of claim 16, wherein each respective remaining flight metric comprises a remaining flight time for the aerial vehicle.

18. The method of claim 16, wherein identifying the particular problem condition comprises:

determining whether a likelihood value corresponding to the particular problem condition exceeds a corresponding threshold value of the plurality of threshold values, wherein the corresponding threshold value is associated with the particular problem condition.

19. The method of claim 16, wherein the training data comprises a plurality of labeled sensor feedback generated by the plurality of aerial vehicles, wherein each respective labeled sensor feedback of the plurality of labeled sensor feedback is labeled with a corresponding problem condition experienced by a corresponding aerial vehicle by which the respective labeled sensor feedback was generated.

20. A non-transitory computer-readable storage medium having stored thereon instructions that, when executed by a computing device, cause the computing device to perform operations comprising:

receiving, from an aerial vehicle of a plurality of aerial vehicles, sensor feedback;

generating, using one or more supervised machine learning (ML) models and based on the sensor feedback, (i) a plurality of likelihood values corresponding to a plurality of possible problem conditions, wherein each respective likelihood value of the plurality of likelihood values indicates a likelihood of the aerial vehicle experiencing a corresponding problem condition of the plurality of possible problem conditions and (ii) a plurality of remaining flight metrics corresponding to the plurality of possible problem conditions, wherein each respective remaining flight metric of the plurality of remaining flight metrics is specific to the aerial vehicle experiencing a corresponding problem condition of the plurality of possible problem conditions, and wherein each of the one or more supervised ML models has been trained using training data generated by the plurality of aerial vehicles having a plurality of different physical configurations that differ from one another by at least one physical component;

identifying, for the aerial vehicle, a particular problem condition of the plurality of possible problem conditions based on comparing (i) the plurality of likelihood values corresponding to the plurality of possible problem conditions to (ii) a plurality of threshold values that are specific to a particular physical configuration of the aerial vehicle, wherein the particular physical configuration of the aerial vehicle is one of the plurality of different physical configurations, wherein the plurality of thresholds are based on a subset of the training data corresponding to an aerial vehicle subset of the plurality of aerial vehicles, and wherein each aerial vehicle of the aerial vehicle subset has the particular physical configuration;

determining a mitigation response for the particular problem condition based on (i) a mission assigned to the aerial vehicle and (ii) the remaining flight metric generated by the one or more supervised ML models for the particular problem condition; and sending the mitigation response to the aerial vehicle in order to cause the aerial vehicle to maneuver according to the mitigation response and thereby automatically respond to the particular problem condition.

\* \* \* \* \*